United States Patent
Saisamarth et al.

(10) Patent No.: US 11,321,620 B2
(45) Date of Patent: May 3, 2022

(54) METHOD AND SYSTEM TO DETECT UNDEFINED ANOMALIES IN PROCESSES

(71) Applicant: Panasonic Intellectual Property Management Co., Ltd., Osaka (JP)

(72) Inventors: Rajesh Phaye Saisamarth, Singapore (SG); Aryel Beck, Singapore (SG); Khai Jun Kek, Singapore (SG); Shunsaku Toshihiro, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/216,130

(22) Filed: Mar. 29, 2021

(65) Prior Publication Data

US 2021/0304035 A1    Sep. 30, 2021

Related U.S. Application Data

(60) Provisional application No. 63/002,980, filed on Mar. 31, 2020.

(51) Int. Cl.
| | |
|---|---|
| *G06N 5/04* | (2006.01) |
| *G06T 7/00* | (2017.01) |
| *G06F 3/0482* | (2013.01) |
| *G06F 3/04847* | (2022.01) |
| *G05B 23/02* | (2006.01) |
| *G06N 20/00* | (2019.01) |

(52) U.S. Cl.
CPC .......... *G06N 5/04* (2013.01); *G05B 23/0259* (2013.01); *G06F 3/0482* (2013.01); *G06F 3/04847* (2013.01); *G06N 20/00* (2019.01); *G06T 7/0004* (2013.01); *G06T 2207/10016* (2013.01); *G06T 2207/20081* (2013.01); *G06T 2207/20104* (2013.01)

(58) Field of Classification Search
CPC ...... G06N 5/04; G06N 20/00; G05B 23/0259; G05B 23/02; G06T 7/00; G06F 3/0482; G06F 3/04847; G06F 3/0484
USPC ......................................................... 715/771
See application file for complete search history.

(56) References Cited

U.S. PATENT DOCUMENTS

| | | | |
|---|---|---|---|
| 10,706,329 B2 * | 7/2020 | Anushiravani | ...... G06N 3/0454 |
| 11,087,864 B2 * | 8/2021 | Xie | .......... G16B 40/00 |
| 11,096,602 B2 * | 8/2021 | Gurevich | .............. G06T 7/0012 |
| 2020/0327381 A1 * | 10/2020 | Tan | ...................... G06F 16/9024 |

(Continued)

*Primary Examiner* — William D Titcomb
(74) *Attorney, Agent, or Firm* — McDermott Will & Emery LLP

(57) ABSTRACT

The present subject matter describes a method to detect anomaly in an environment based on AI techniques. The method comprises receiving one or more data representations of one or more objects present in an environment. A first-type of information is captured from a first-area within the one or more data representations. A second-type of information from a second-area different than the first area in the data representations is also captured. A third information is generated from the first information, said third information corresponding to predicted information for the second area using one or more artificial-intelligence models for evaluating the second information. The third information is compared with the second information to determine abnormality with respect to state or operation of one or more objects within the environment.

20 Claims, 17 Drawing Sheets

(56) References Cited

U.S. PATENT DOCUMENTS

| | | | |
|---|---|---|---|
| 2021/0027116 A1* | 1/2021 | Monaghan | G06K 9/6219 |
| 2021/0073671 A1* | 3/2021 | Puri | G06N 5/04 |
| 2021/0166150 A1* | 6/2021 | Wang | G06K 9/6256 |
| 2021/0304891 A1* | 9/2021 | Kozloski | G06N 3/006 |

* cited by examiner (d)

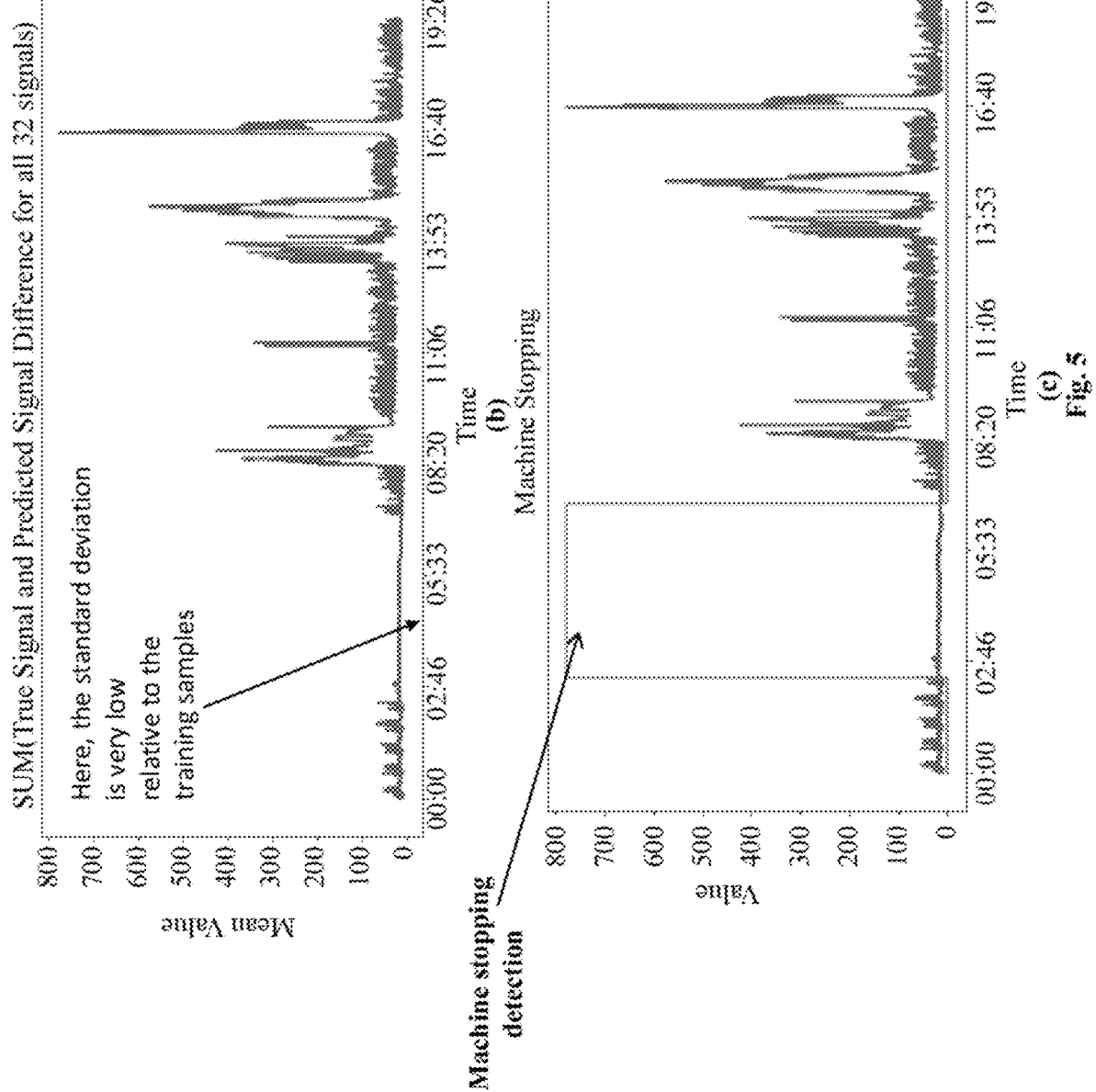

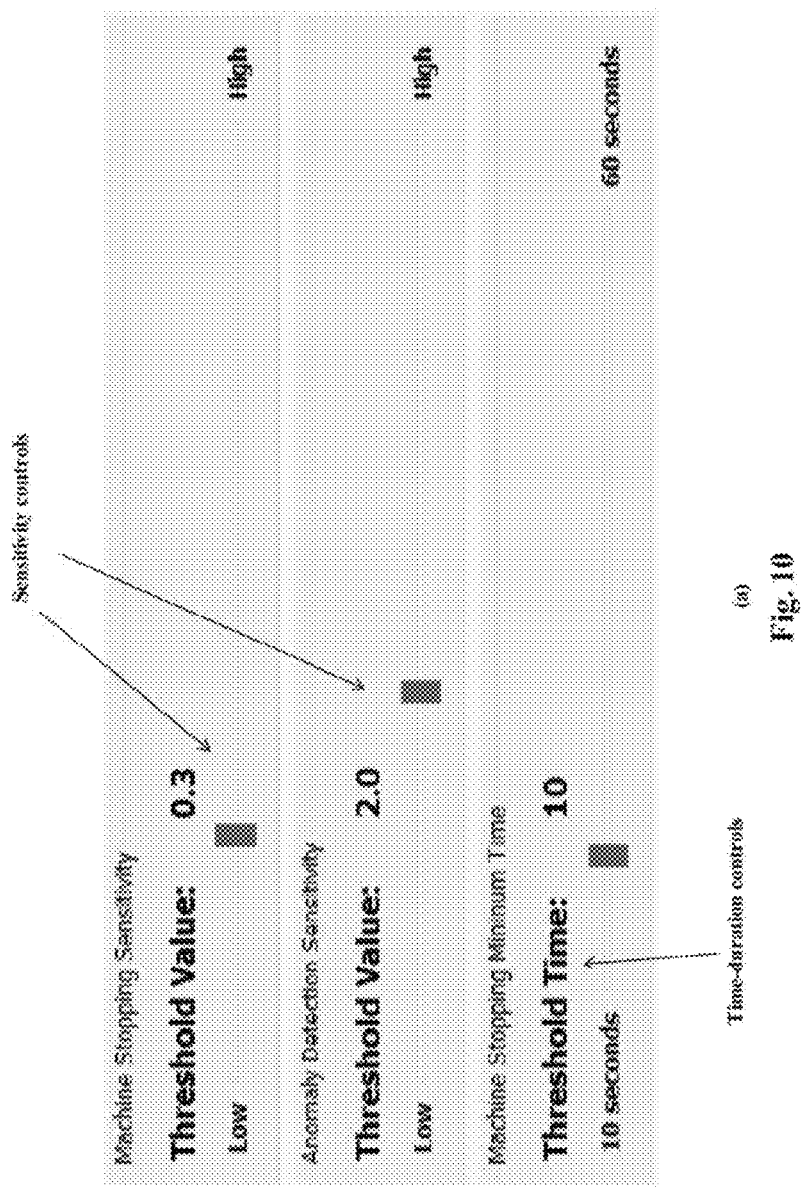

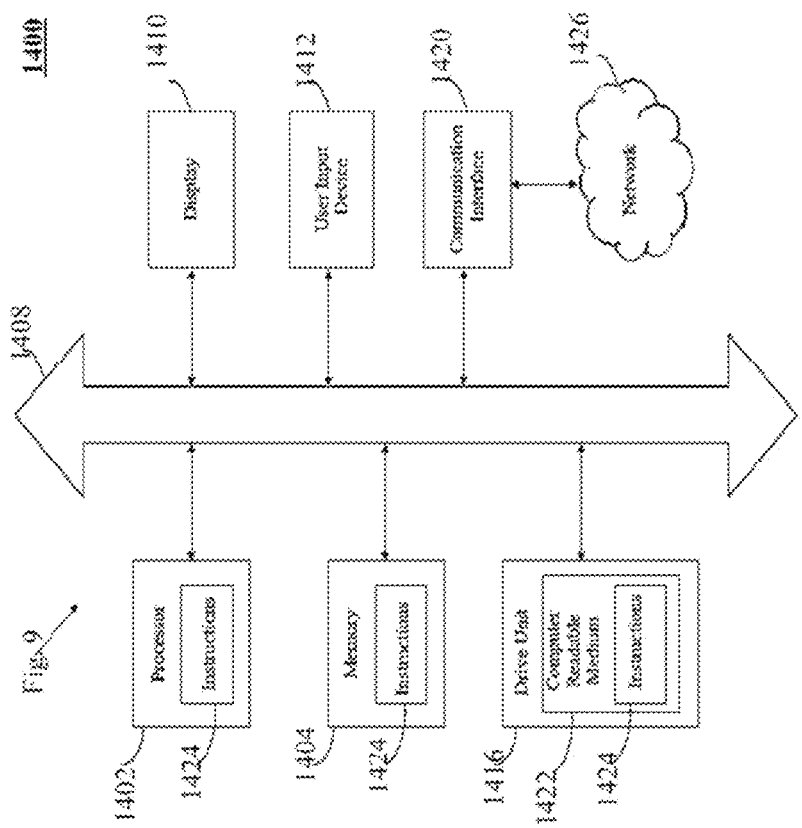

METHOD AND SYSTEM TO DETECT UNDEFINED ANOMALIES IN PROCESSES

CROSS REFERENCE TO RELATED APPLICATION

This application claims the benefit of priority of U.S. Provisional Patent Application No. 63/002,980, filed on Mar. 31, 2020, the content of which is hereby incorporated by reference.

TECHNICAL FIELD

The present invention generally relates to artificial-intelligence (AI) enabled inspection of processes and in particular, relates to detecting anomaly in processes.

BACKGROUND

Detecting anomaly on an automated chain line is always a challenge. There is always a scarcity of data and the solutions to cater to diagnosis of a wide-range of potential undefined anomalies, such as catastrophes, a human-being committing an unexpected wrong, machines malfunctions etc. Example state of the art methods typically rely on dimensionality reduction on the statistical features of image frames. At least a problem with such approaches is unreliability because of the information loss caused by the application of the dimensionality-reduction based methods. While the state of the art anomaly detection system and methods are able to detect pre-defined anomalies, the same usually fall short of generalizing or categorizing any sort of unforeseen or first of its kind anomalies around the machine in the background.

Example prior art solutions operate upon different contexts, like CCTV street monitoring, temperature monitoring in machines etc. Factory machines move in a cyclic-fashion or cyclically. Every part of the machine undertakes the same actions periodically or in other words operates in a loop (cycle), thereby exhibiting a cycle time.

Yet, in respect of specific contexts such as the movement of the signals exhibiting cyclic pattern (e.g. Factory Machines surveillance), the state of the art anomaly detection methods prove short of expectation owing to the complexity and specificity involved in such type of detection. Moreover, even when it comes to commensurate mechanisms available in the state of the art that may be attempted to detect anomalies, such mechanisms are either very complex, require labeling of the data, and do not support real-time execution.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting or classifying condition of any material or object or any feature/attribute related to the material/object either in a fully automated environment or through a semi-automatic mechanism.

The present subject matter describes a method to capture and label an undefined anomaly in an environment based on AI techniques. The method comprises executing a single media or multimedia file denoting an operation or state with respect to at least one object for a predefined time period. The unlabeled data is captured based on the execution of the file and splitting the captured unlabelled data into a plurality of sub data-sets. At least one sub set of data is automatically labelled as a Ground Truth label. One or more features are captured from one or more sub datasets other than labelled sub dataset. A supervised machine learning (ML) based training is iteratively conducted for each of a plurality of AI models based on predicting labels of the one or more sub datasets based on the captured features. The predicted labels of the one or more sub datasets are compared based on comparing predicted label against the labelled dataset. The plurality of trained AI models is aggregated to enable capturing of abnormality with respect to the operation or state of the at-least one object.

In other embodiment, the present subject matter describes a method to detect anomaly in an environment based on AI techniques. The method comprises receiving one or more data representations of one or more objects present in an environment. A first-type of information is captured from a first-area within the one or more data representations. A second-type of information from a second-area different than the first area in the data representations is also captured. A third information is generated from the first information, said third information corresponding to predicted information for the second area using one or more artificial-intelligence models for evaluating the second information. The third information is compared with the second information to determine abnormality with respect to state or operation of one or more objects within the environment.

The present subject matter at least facilitates the performance of anomaly detection for single or multiple machines. The proposed methods can use a single data representation such as a video or a combination of sensor as inputs, and is trained on an unlabelled data (i.e. corresponding to an unsupervised problem) offline and online. Moreover, anomalies of different machines can be detected separately.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 11 illustrates an implementation of the system as illustrated in preceding figures in a computing environment, in accordance with another embodiment of the present subject matter.

Figure 1:
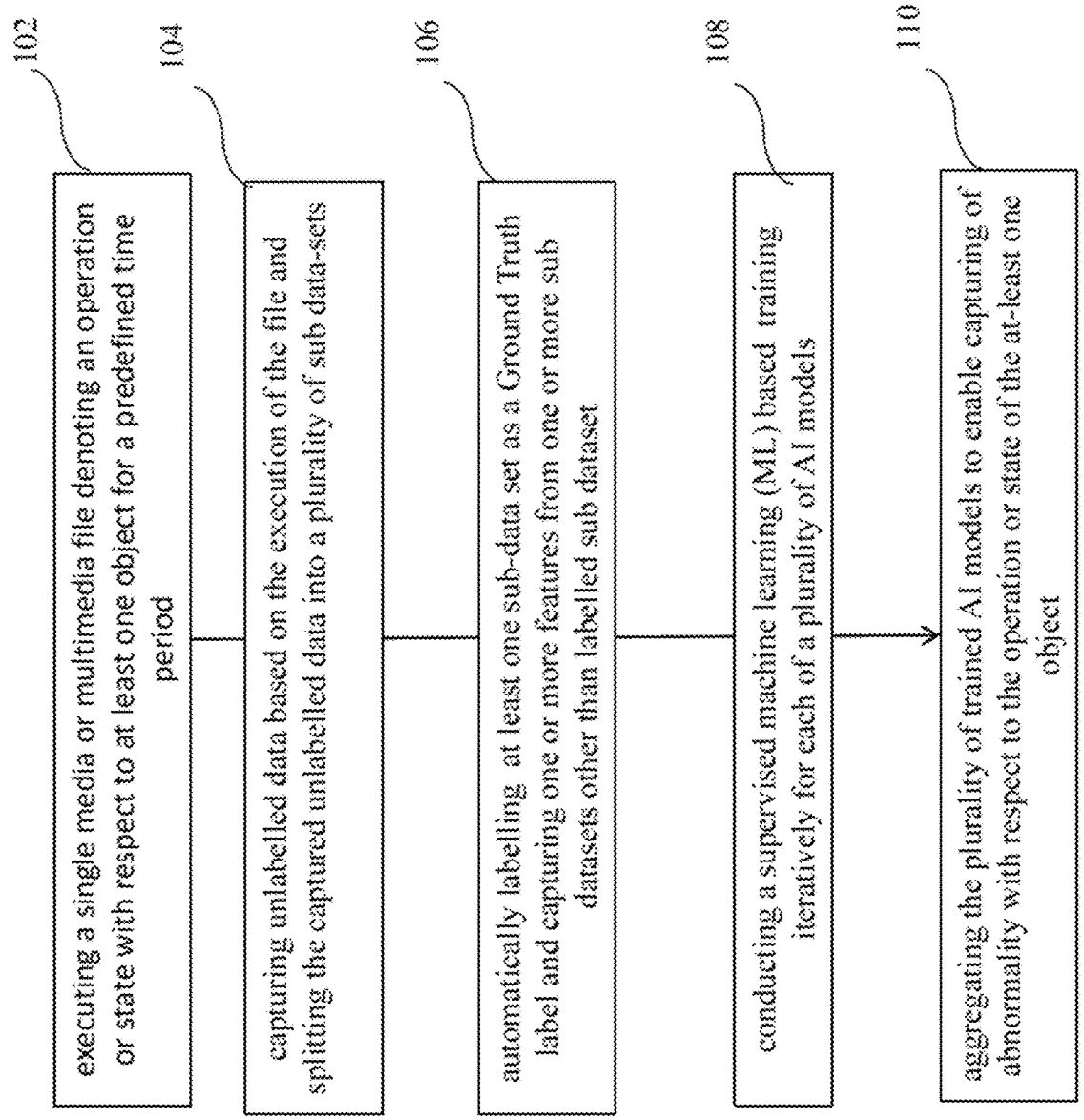
FIG. 1 illustrates method steps in accordance with the embodiment of the present subject matter.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present subject matter are described below in detail with reference to the accompanying drawings.

FIG. 1 illustrates method steps in accordance with an embodiment of the present subject matter. The present subject matter refers to a method to capture and label an undefined anomaly in an environment based on AI techniques. The method comprises executing (step 102) a single media or multimedia file denoting an operation or state with respect to at least one object for a predefined time period. In an embodiment, the execution of the single media or multimedia file causes the capturing of unlabelled data as single mode or multi modal data. The multimodal input data is captured based on one or more of: i) a playback of video file captured by imaging sensor for visually depicting the state or operation of the at least one device, ii) a playback of audio file captured by acoustic sensor for acoustically depicting the state or operation of the at least one device, iii) a simulation of audio-visual data captured by imaging and acoustic sensor and associated with state or operation of the at least one device, iv) a simulation of spatial orientation captured by an IMU sensor and associated with the state or operation of the at least one device and iv) a simulation of resource-consumption captured by a power-meter and associated with the state or operation of the at least one device. The single mode or multimodal data is associated with a cyclic pattern associated with the state or operation of the at-least one object.

Further, the method comprises capturing (step 104) unlabelled data based on the execution of the file and splitting the captured unlabelled data into a plurality of sub data-sets.

Further, the method comprises automatically labelling (step 106) at least one sub-data set as a Ground Truth label and capturing one or more features from one or more sub datasets other than labelled sub dataset. In an embodiment, the capturing of the features from the one or more sub data set other than the labelled sub dataset comprises capturing variation of at-least one parameter related to the operation or state of the at least one object for the predefined time period based on the execution of the file. Thereafter, the cyclic pattern related to the operation or state of the at least one object is captured for the predefined time period based on the execution of the file. Further, at-least one type of statistical-feature is determined from said variation of at-least one parameter and/or the cyclic pattern;

In an example, the at least one varying parameter and the cyclic pattern is obtained as an aggregated value across a plurality of values obtained from single mode or multimodal data. The at-least one determined statistical parameter relates to a standard deviation or mean associated with respect to the varying parameter.

Further, the method comprises conducting (step 108) a supervised machine learning (ML) by training iteratively for each of a plurality of AI models based on predicting labels of the one or more sub datasets based on the captured features. Further, as a part of supervised training the predicted labels of the one or more sub datasets are compared against the labelled dataset. The plurality of trained AI models are aggregated (step 110) to enable capturing of abnormality with respect to the operation or state of the at-least one object.

As a part of training phase, the method further comprises testing the aggregated AI model based on the plurality of trained AI modules to detect abnormality in the state or operation of the at least one object based on a current determined statistical parameter exceeding the statistical parameter determined during the training. The abnormality corresponds to a) either halt in operation or state of the at least one object, and b) an irregularity in the operation or state of the at least one object.

Figure 2:
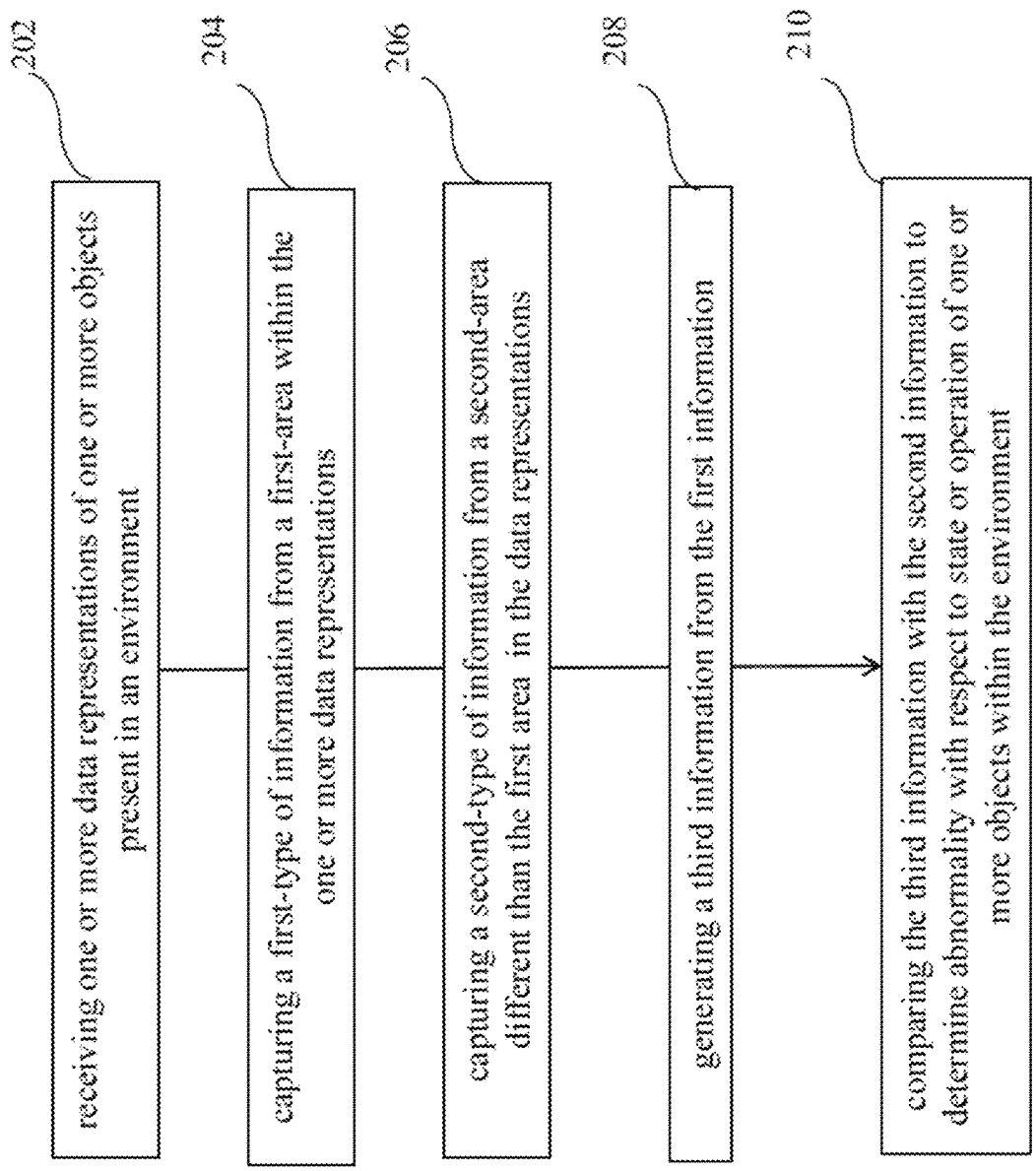
FIG. 2 illustrates method steps in accordance with another embodiment of the present subject matter.

FIG. 2 illustrates method steps in accordance with another embodiment of the present subject matter. The method refers to a method to detect anomaly in an environment based on AI techniques.

The method comprises receiving (step 202) one or more data representations of one or more objects present in an environment. In an example, one or more objects undergo a cyclic operation within the environment, such that the cyclic operation is detectable from the data representations, said data representations corresponding to single mode or multimodal data comprising images, audio, audio-visual data, resource consumption, and spatial orientation pertaining to the at least one object within the environment.

A first type of information is captured (step 204) by capturing a first-type of information from a first-area within the one or more data representations. Further, a second-type of information is captured (step 206) from a second-area different than the first area in the data representations. In an embodiment, the capturing of the first information and the second information comprises capturing the first information and the second information from the one or more data representations pertaining to the same time slot.

In an example, a user selection of a region of interest (ROI) in the one or more data representations of the one or more objects in the environment may be received through a GUI for facilitating the detection of the abnormality, said abnormality corresponding to an undefined anomaly. The ROI corresponds to the second-area within one or more data representations for enabling the capturing of the second type of information.

Further, the method comprises generating a third information (step 208) from the first information, wherein the third information corresponds to predicted information for the second area using one or more artificial-intelligence models for evaluating the second information. In an example, generating the third information comprises predicting the signal value for the second area through the AI model configured for estimating a signal (N) in respect of the second area from a plurality of the signals (N-1) associated with the first area.

Further, the method comprises comparing (step 210) the third information with the second information to determine abnormality concerning state or operation of one or more objects within the environment. In an example, the steps 202) to 210) may be iteratively executed to estimate N number of the signals for the second area as a part of an inference stage performance. The AI model used for estimation corresponds to an aggregation of one or more AI models trained during a training phase in accordance with the description of FIG. 1.

Further, the method further comprises displaying through the GUI a detected abnormality with respect to state and operation of the one or more objects or a detected halt in operation or state of the one or more objects. Such displaying of abnormality and/or halt in operation or state comprises displaying a graphical distribution of one or more of mean or standard deviation (as raw data) pertaining to the one or more captured data representations against the time slots pertaining to capturing of the data representations. At least a portion of said graphical distribution is identified as corresponding to the abnormality or the halt in operation or state.

FIG. 3 (*a* and *b*) illustrates a constrained linear regression (LR) based anomaly detection in accordance with an embodiment of the present subject matter.

As referred in the preceding description of FIG. 1, the present subject matter refers a transition from unsupervised to supervised ML. Assuming an image as an example data representation, the image may be divided Divide the image in N blocks. The features for each block are extracted and iteratively N-1 blocks are used as predictor for the $N^{th}$ block (i.e. Ground Truth). Based thereupon and as referred in FIG. 2, in case the comparison between the AI model predicted value and the actual value for the Nth block depicts a discrepancy, the same is detected as the anomaly. Further, in embodiment, the $N_{th}$ block or the area of interest may be selected by the user as the area of interest in accordance with later FIG. 7 and FIG. 10.

Figure 3A:
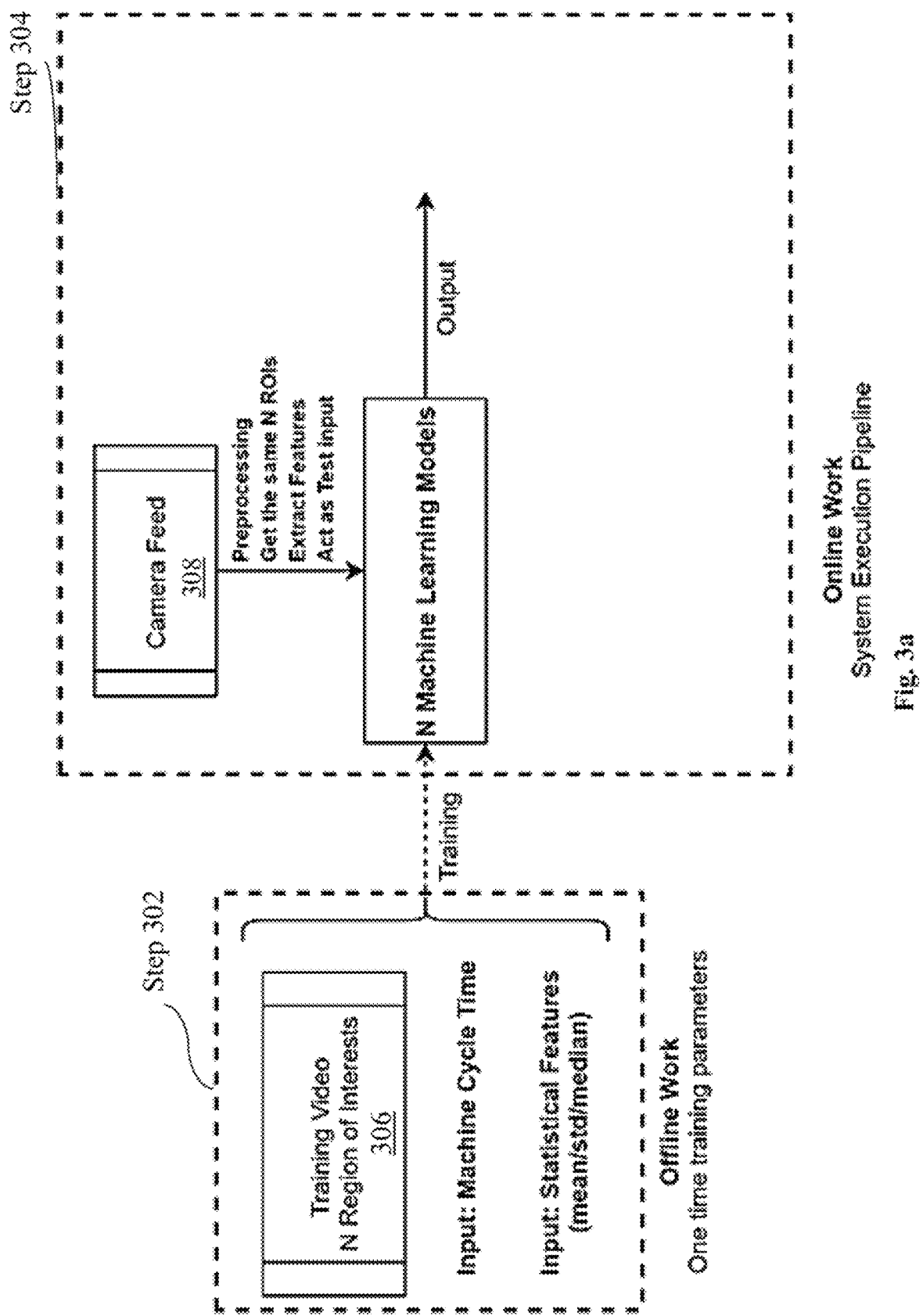
FIG. 3 (*a* and *b*) illustrates a constrained linear regression (LR) based anomaly detection in accordance with an embodiment of the present subject matter.
Figure 3B:
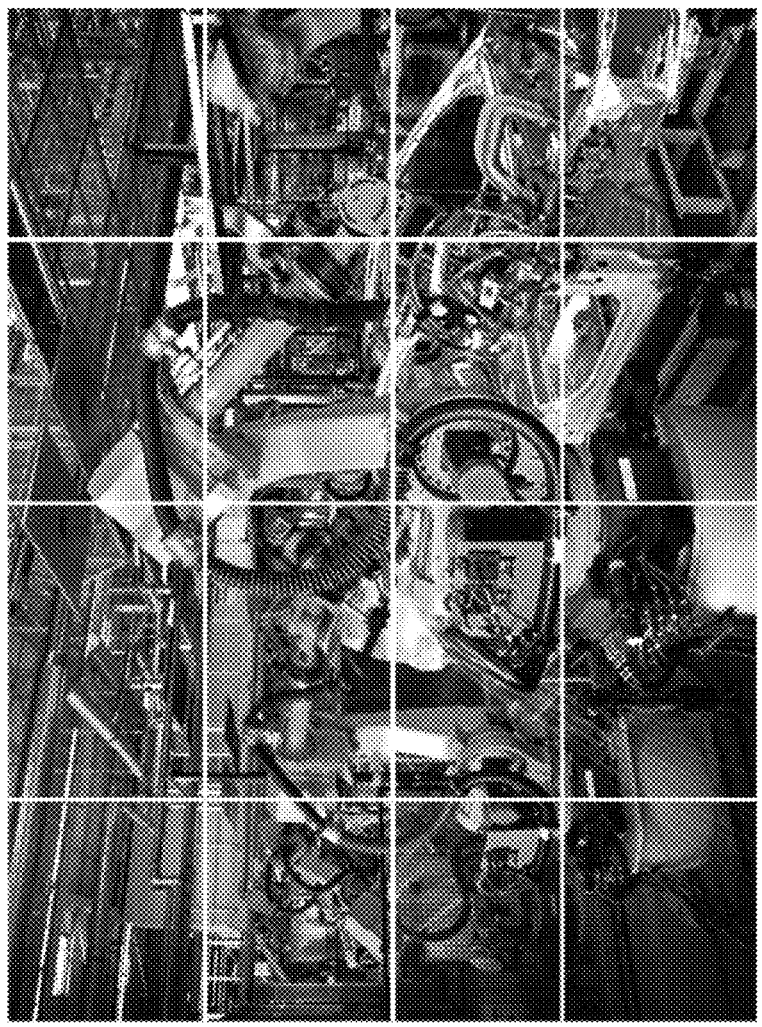

In an example with respect to the present FIG. 3b, a single machine video (as provided the input sensor), each video frame is divided into 4×4 grid i.e., 16 blocks. For each image block, the mean and standard deviation of the pixel values are computed as statistical values. Accordingly, for the 16 blocks, a total number of 32 signal values (16 mean values and 16 standard deviation values) are computed. The video may correspond to a playback of video file captured by imaging sensor for visually depicting the state or operation of the at least one device.

Likewise, multiple anomaly detection models (i.e. N-1 models) may run concurrently with respect to the same data representation or video in real-time to draw aggregated prediction for the $N^{th}$ block. Accordingly, multiple machines may be monitored based on capturing of data from a single device such as a camera, acoustic sensor, inertial-motion unit etc. embedded with a computing system. Accordingly, anything abnormal captured by an imaging system may potentially be detected for instance: machine stopping, people walking around the machines, etc.

In operation as depicted within FIG. 3a, the offline stage 302 or training stage of a pipeline 300 corresponds to the operation in FIG. 1. As a part of training and in an example, the camera is set in a stable position. A sample video of 2-3 cycles depicting the machine operation represents the possible scenarios for "normal usage" may be referred as the training video for training the AI model or the anomaly detection model (i.e. the LR model). Further, an average image inspection time may be set as 15-16 seconds which may correspond to integer multiple of an average time the machine takes for one cycle (i.e. a cycle time). Optionally, through a user interface, the user may select the specific region of interests in the video (i.e. second area or Nth block), different features, and parameters for refinement for achieving a customized training process. In an example, a user-selection of one or more features pertaining to data representations from the GUI is received. The features optionally define one or more of illumination, audio, resource consumption, movement, spatial-orientation captured within the one or more data representations with respect to the one or more objects. Accordingly, the abnormality may be further detected during the online stage 304 in accordance with the features selected through the user-selection As a part of online stage 304 or real-time operation of FIG. 3*a*, the anomaly detection model (interchangeably referred as the AI model or the LR model) may be appropriated in accordance with the description of FIG. 2. As a part of underlying algorithm, following steps may be performed:
 a. for each signal "i" in the N signals, the remaining N-1 signals are used as an input
 b. Use this input to predict the signal "i" value using a Regression (LR)
 c. If this predicted signal i is in the same range as the signal value, signal is okay and no anomalies are detected
 d. If the predicted signal i is not in the same range, then there is some problem with the signals and accordingly, anomaly is detected.

Accordingly, as soon as any signal changes in the input and results in a condition equivalent to step d) of the Stage 304, the discrepancy is detected.

Further, while the present description covers the data representation as image or image frame of a video, the same may be construed to also cover the multimodal input data such as audio data, movement data, orientation data or resource consumption data. Such data may be captured based on one or more of: i) a playback of audio file captured by acoustic sensor for acoustically depicting the state or operation of the at least one device, ii) a simulation of audio-visual data captured by imaging and acoustic sensor and associated with state or operation of the at least one device, iii) a simulation of spatial orientation captured by an IMU sensor and associated with the state or operation of the at least one device and iv) a simulation of resource-consumption captured by a power-meter and associated with the state or operation of the at least one device.

However, for sake of illustration and merely as an example, the following description covers the input data or the data representation (which is subject to anomaly detection) as an image frame.

Figure 4:
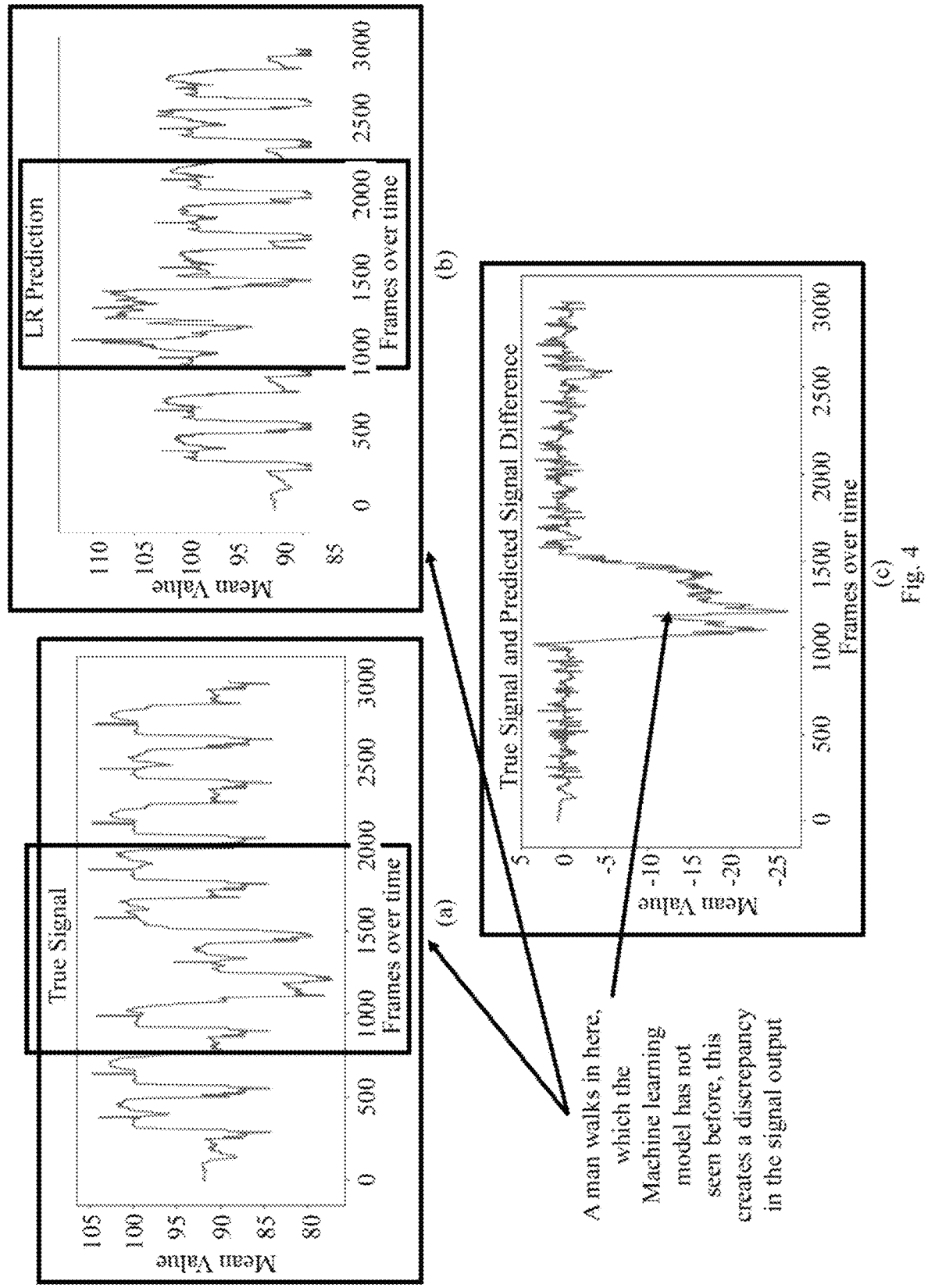
FIG. 4 (*a* to *f*) illustrates output of one of the Linear Regression (LR) model, in accordance with an embodiment of the present subject matter.
Figure 4:
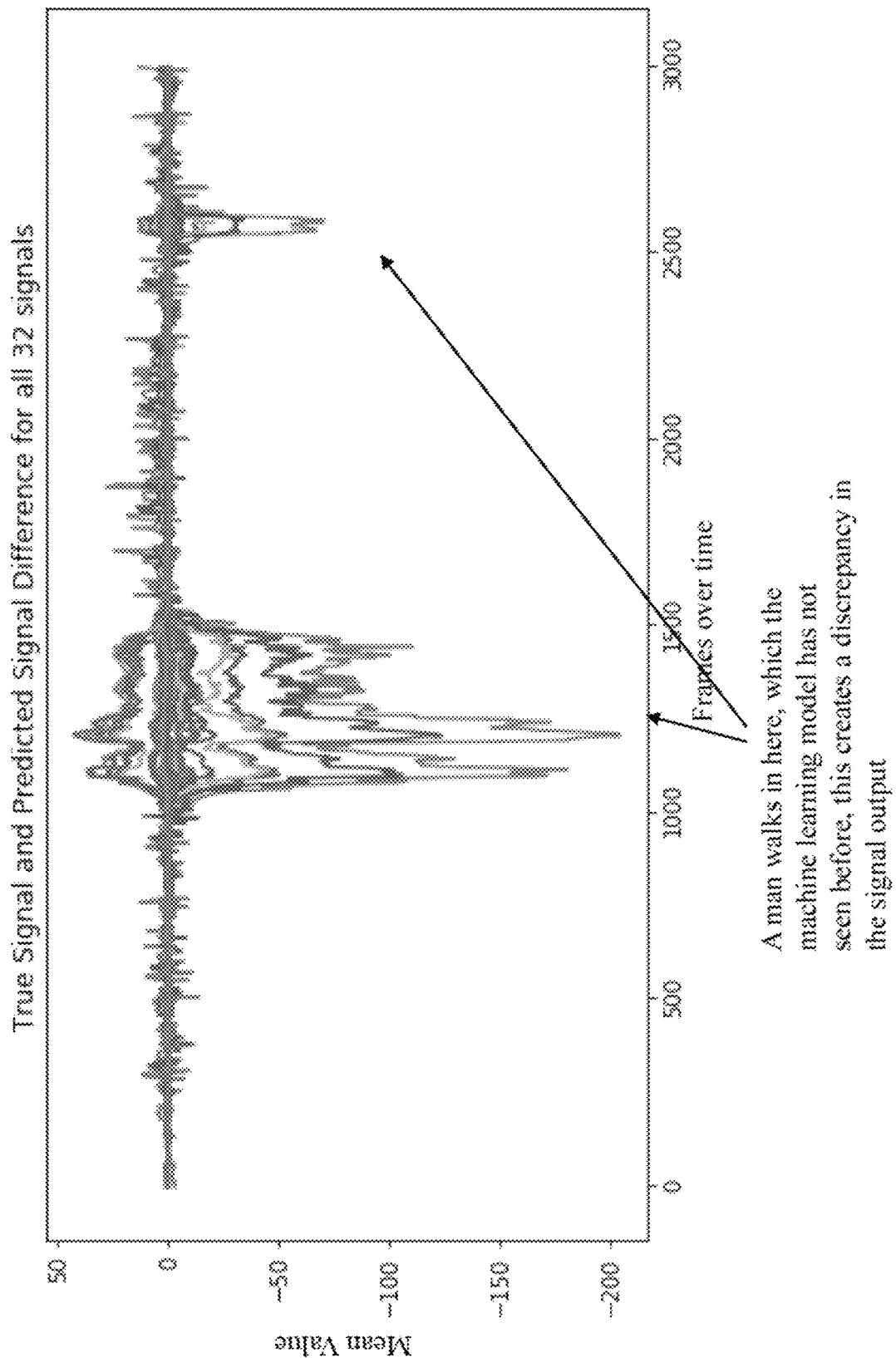
Figure 4:
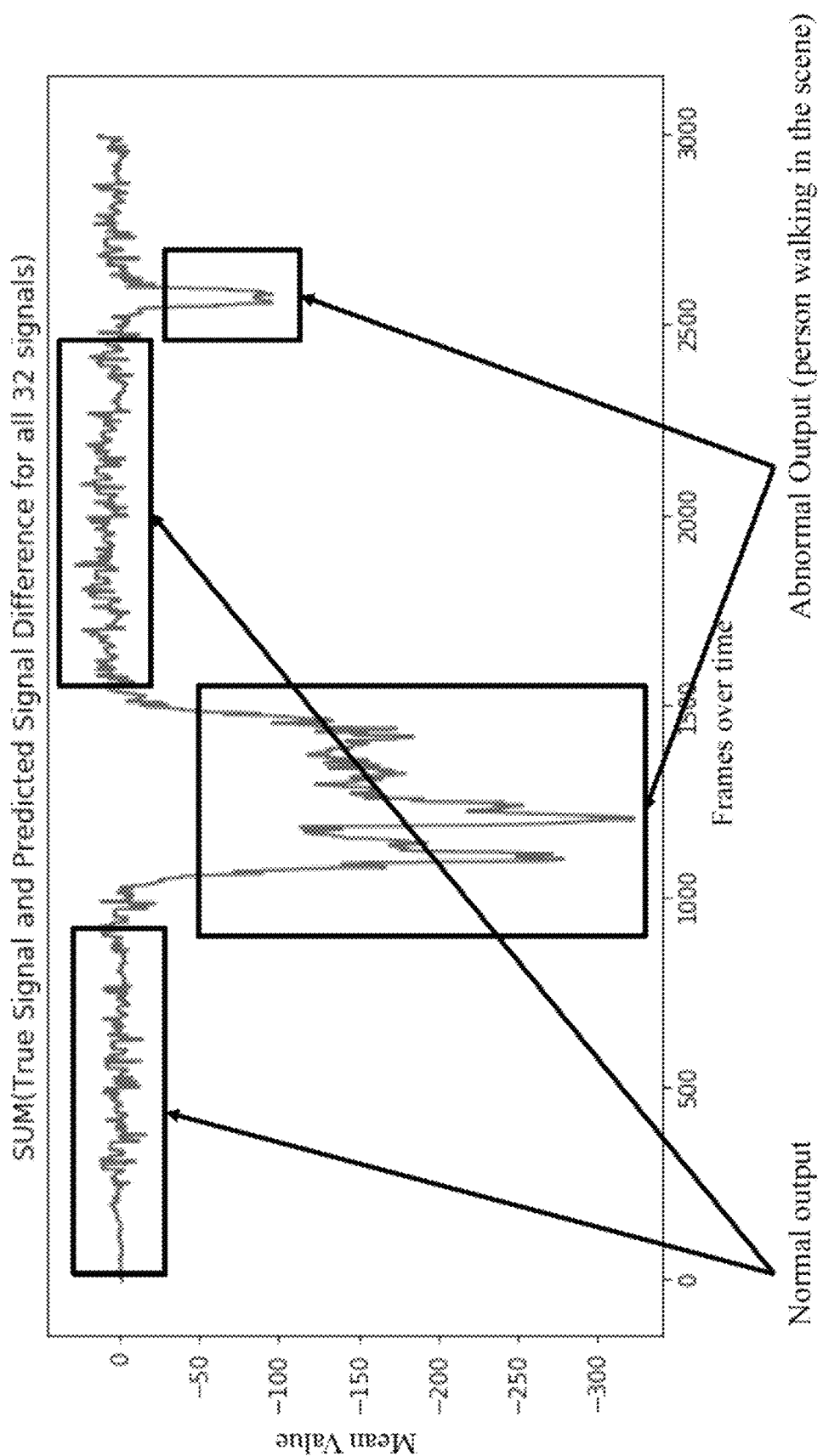
Figure 4:
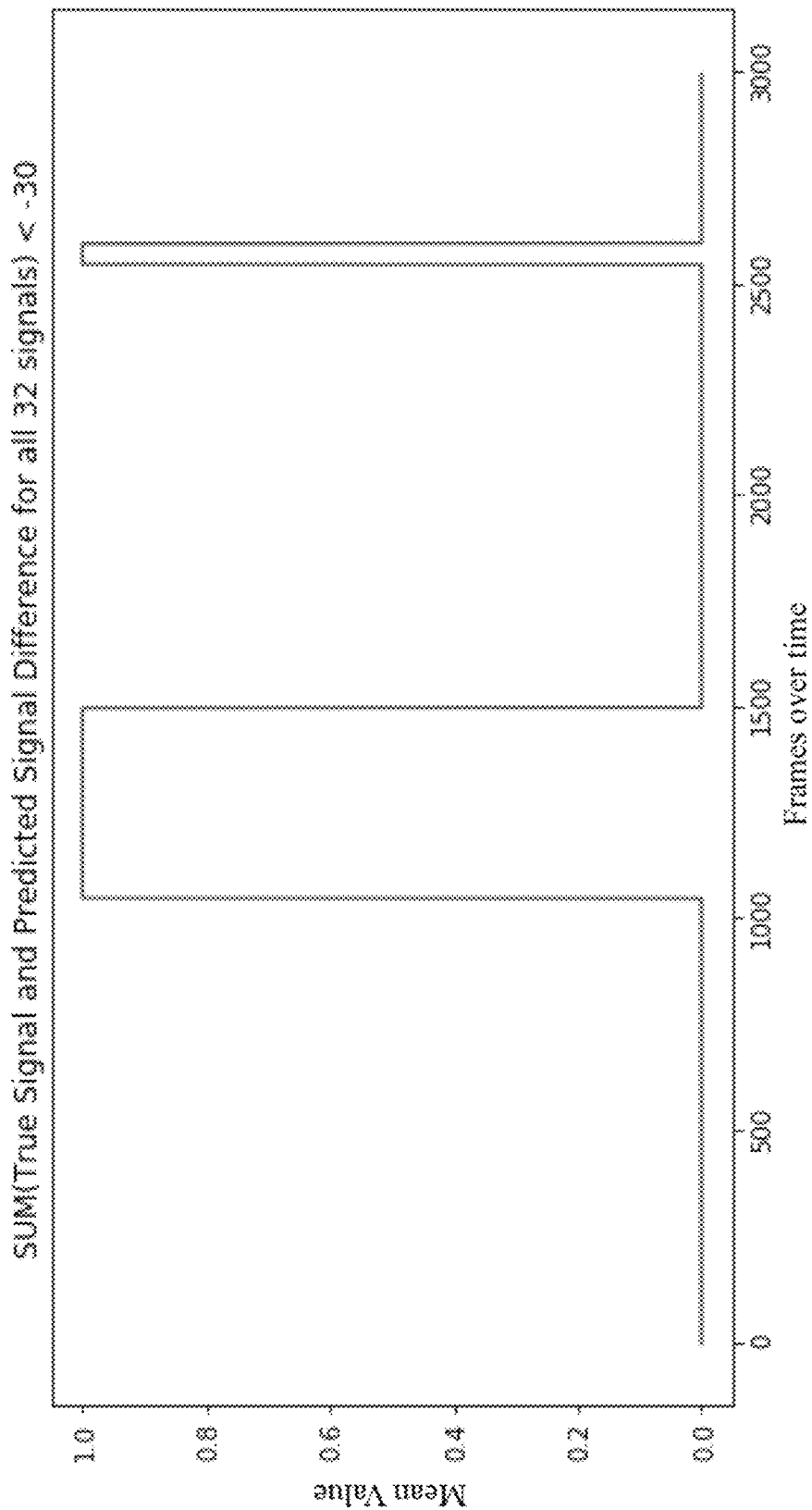

FIG. 4 (*a* to *f*) illustrates an output of one of the Linear Regression (LR) model out of the 32 regression models corresponding to 32 signal values or statistical values as in FIG. 3*b* and accordingly depicts the output of operation of stage 304 in FIG. 3*a*.

As may be understood, the movement of 32 signals over time is correlated to each other due to cyclic pattern in the operation of machines. This is at least due to the fact that when the object or machine movement is constrained to a cycle, the dependencies of all 32 signals may be learned by the AI model. In other words, a trained AI model in accordance with FIG. 1 upon receiving the input of 31 signals can predict the $32^{nd}$ signal's value.

FIGS. 4*a* to 4*c* illustrates a few signal-examples of different blocks in the video. As seen in FIG. 4*a*, until 1000 frames, all the signal-values are following the same cyclic fashion. But after 1000th frame, there are some signals which are disturbed because of an example anomaly, i.e. a man walks into a part of the video. A man walks in here, which the Machine learning model or the LR model has not seen before. This creates a discrepancy in the signal-output. In other words, the block's mean and standard deviation values are disturbed.

FIG. 4*b* illustrates the predicted value for $N^{th}$ block after $1000^{th}$ frame and FIG. 4*c* illustrates the difference between the true-representation of FIG. 4*a* to FIG. 4*c*. Overall, FIG. 4*c* represents the difference with respect to the output of one of the Linear Regression (LR) out of the 32 regression models FIG. 4*d* illustrates output of the 32 LRs when compared with single LR output of FIG. 4*c*. FIG. 4*e* corresponds to sum output equivalent of FIG. 4*d* and accordingly classifies the normal and abnormal behaviour. FIG. 4*f* finally represents detection of anomalies after $1000^{th}$ frame and accordingly an outcome of Stage 304 of FIG. 3*a*. The detected anomalies may be defined by the criteria that "Output of the 32 LRs (SUM<−30)".

Figure 5:
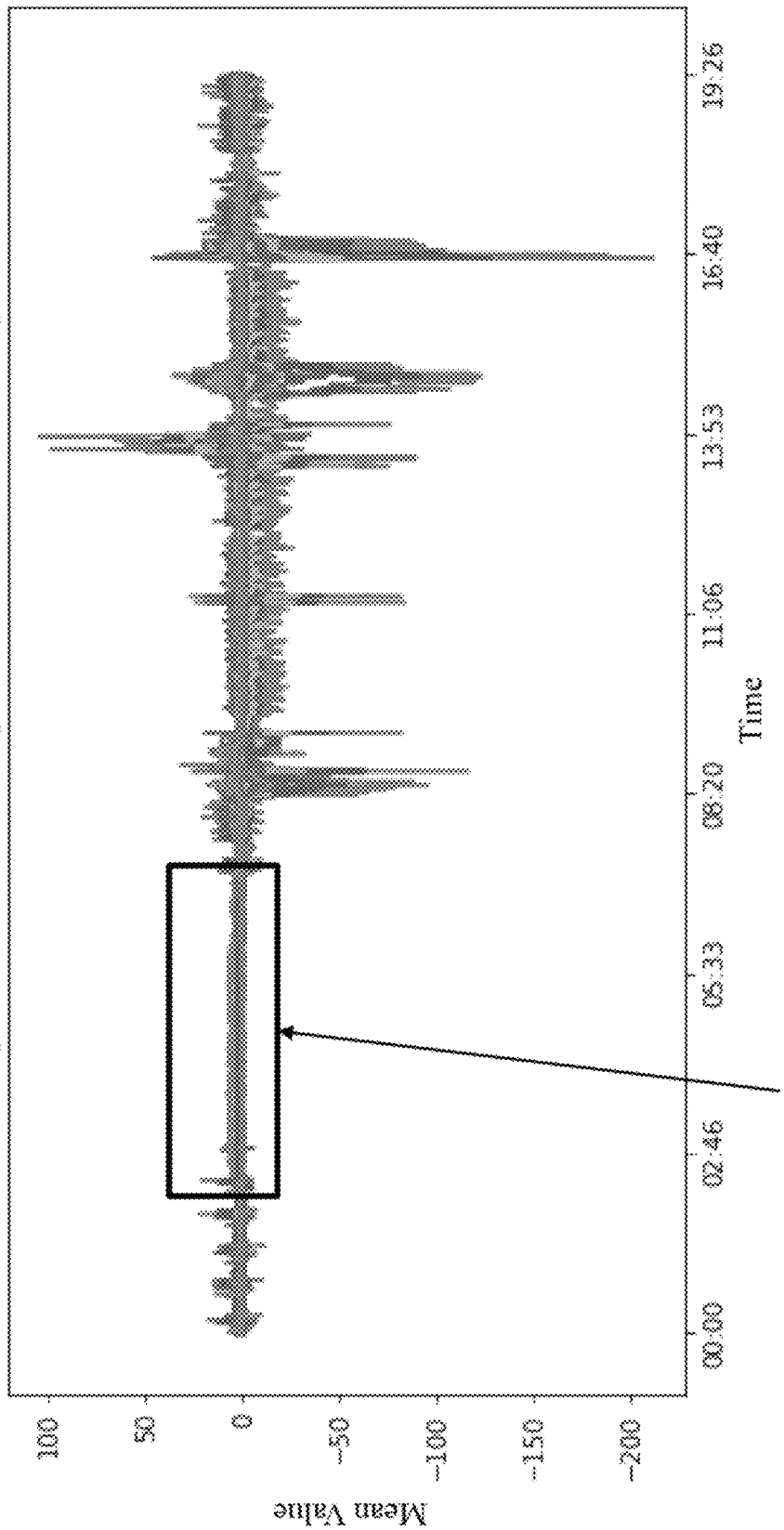
FIG. 5 illustrates detection of "Machine Stopping" as the anomaly detection, in accordance with an embodiment of the present subject matter.

FIG. 5 illustrates detection of "Machine Stopping" as the anomaly detection as the output of stage 304 of FIG. 3*a*. More specifically, the example training video sample of Stage 302 of FIG. 3*a* may have 2-3 cycle movements. During the training phase of Stage 302 of FIG. 3*a*, the standard deviation of the output of the LR model or the anomaly detection model is computed during and referred as train_std. If during test time, the standard deviation is less than train_std*0.4, then the machine is expected to have stopped with a high probability. The value 0.4 as a tuning parameter may be changed through a graphic user interface (GUI) as depicted later in FIG. 10 to increase/decrease the sensitivity.

As indicated in FIG. 5*a* and FIG. 5*b*, a portion of graph corresponds to the standard deviation as being very low relative to the training samples. Accordingly, it may be noticed notice that the output of the ML models dosen't vary much over time. Accordingly, "machine stoppage" related anomaly has been detected as corresponding to such portion of graph corresponding to low standard deviation.

Figure 6:
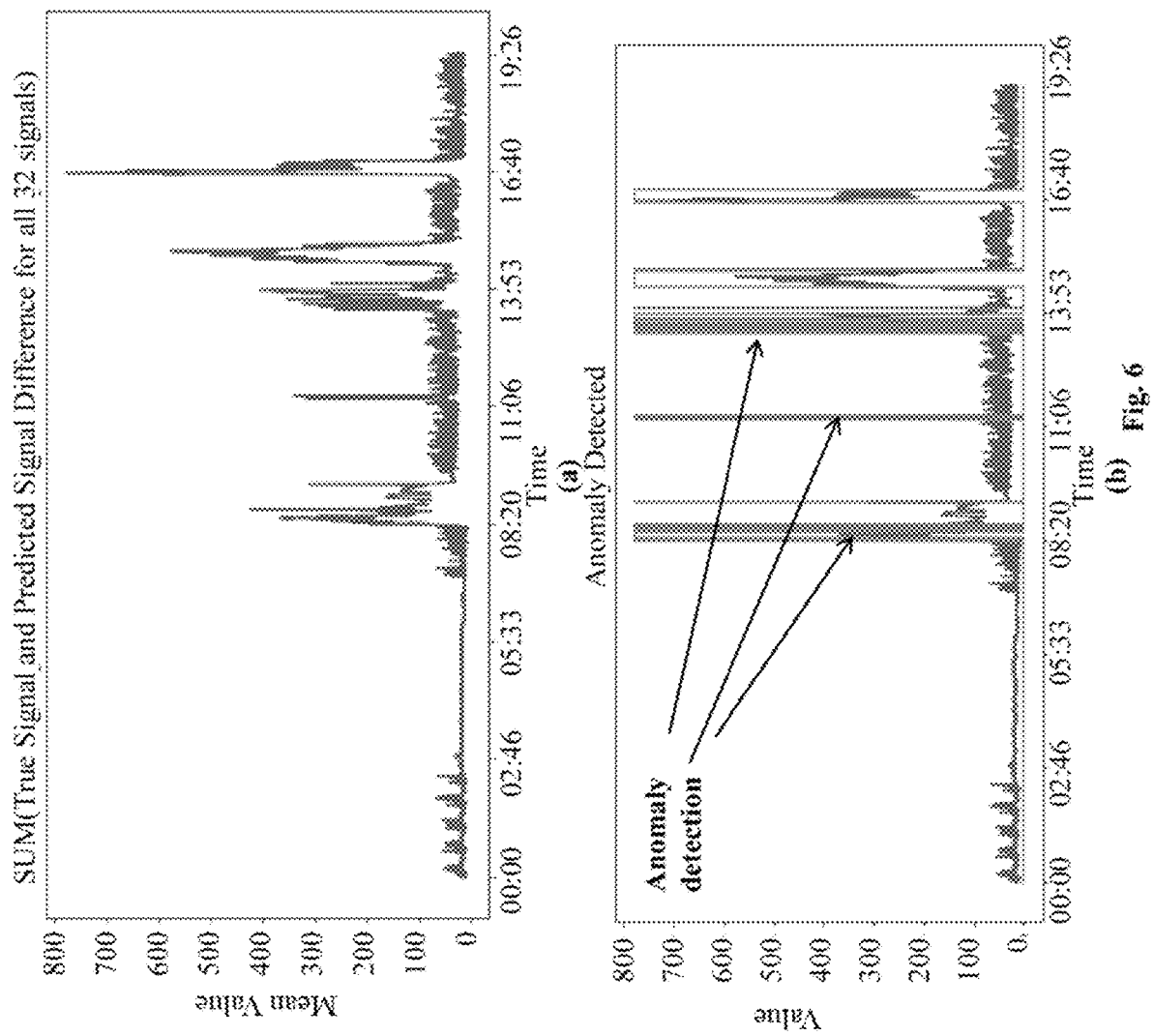
FIG. 6 illustrates anomaly-detection as the output of FIG. 3 in accordance with an embodiment of the present subject matter.

FIG. 6 illustrates anomaly-detection as the output of stage 304 of FIG. 3*a*. Based on the training video sample of Stage 302 of FIG. 3*a* having 2-3 cycle movements, the mean of the output of anomaly detection model and a range of the output are computed and referred as "train_mean" and "train_range", respectively. If during test time, the output mean value is more than train_mean+4*train_range, then the machine probably has an anomaly. The value 4 as a tuning parameter may be changed through a graphic user interface (GUI) as depicted later in FIG. 10 to increase/decrease sensitivity.

As indicated in FIG. 6*a* and FIG. 6*b*, a portion of graph corresponds to the mean as being very high relative to the training samples. Accordingly, it may be noticed notice that the output of the ML models substantially over time. Accordingly, anomaly has been detected as corresponding to such portion of graph corresponding to high mean variation.

Figure 7:
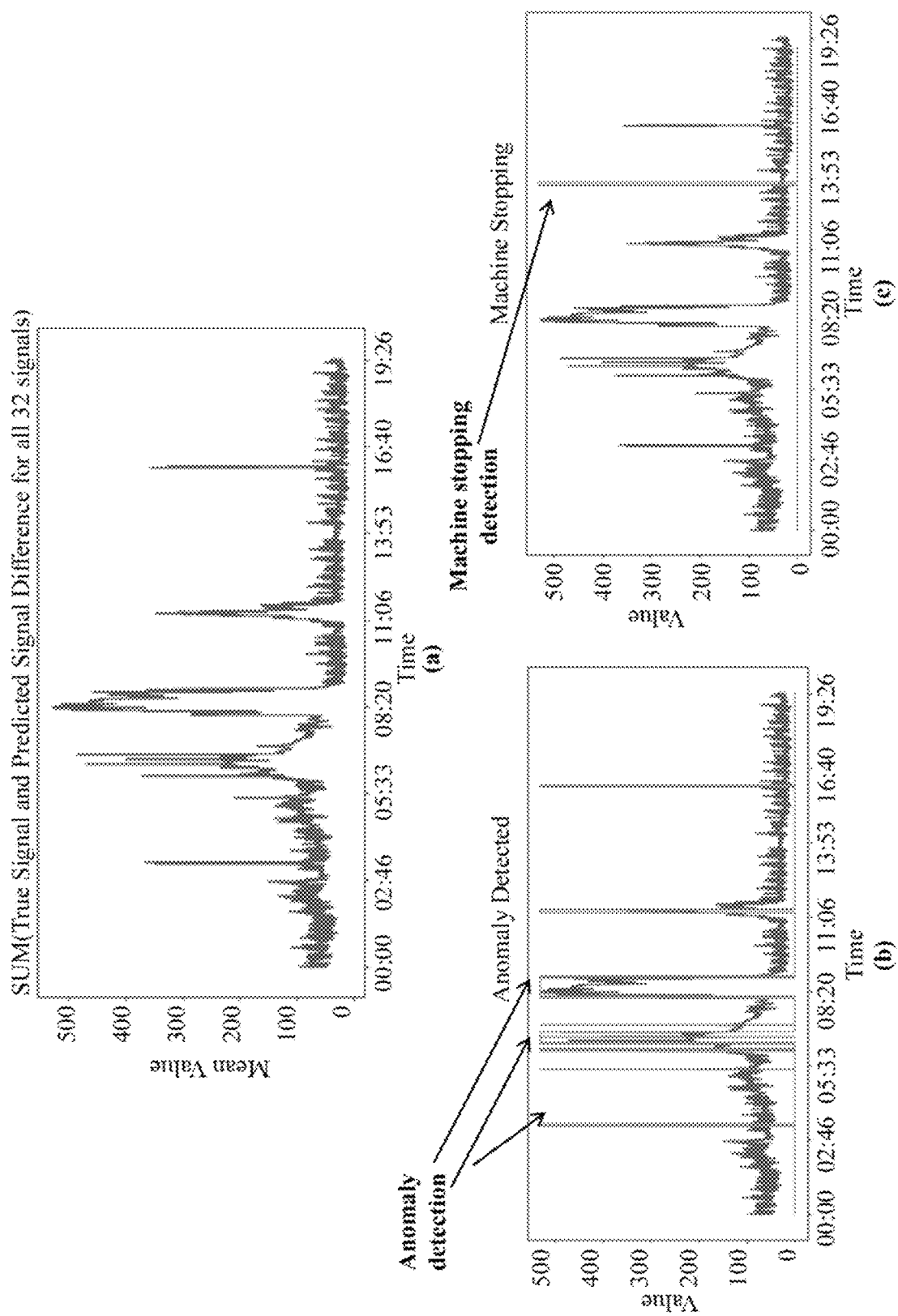
FIG. 7 illustrates another example of machine stopping and anomaly-detection in accordance with an embodiment of the present subject matter.

FIG. 7 illustrates another example of machine stopping and anomaly-detection as the output of stage 304 of FIG. 3*b*.

Figure 8:
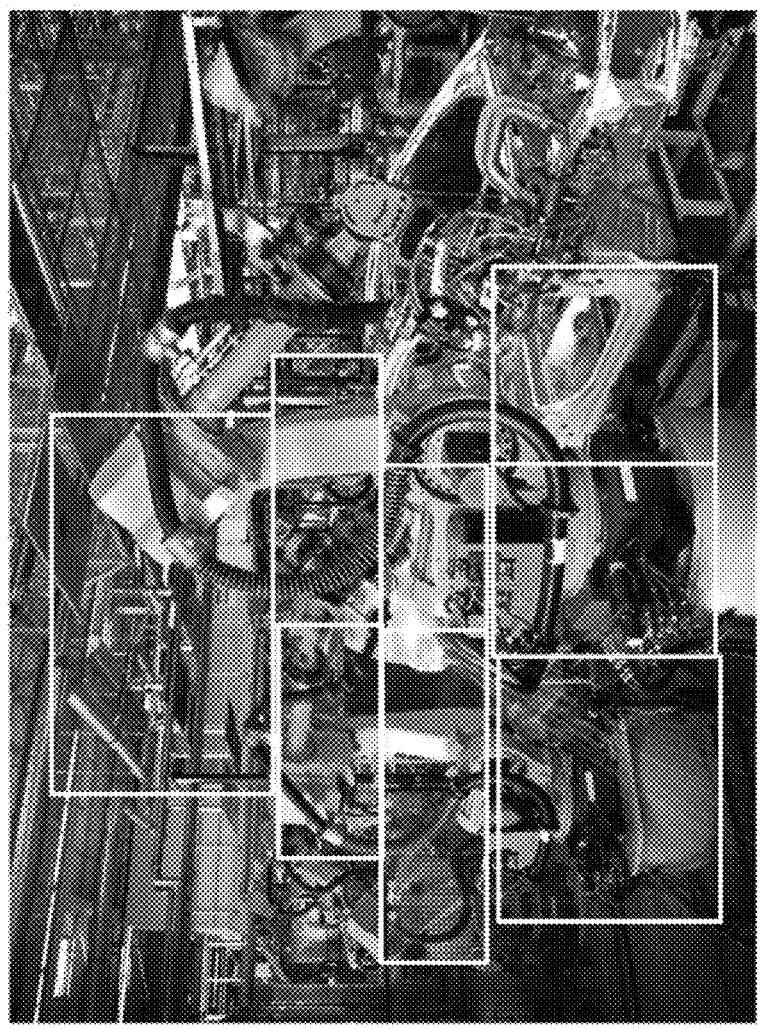
FIG. 8 illustrates selection of the specific ROI for executing the training and inference as referred in the description of FIG. 1 and FIG. 2 in accordance with an embodiment of the present subject matter.

FIG. 8 illustrates selection of the specific ROI for executing the training and inference as referred in the description of FIG. 1 and FIG. 2. The examples in the preceding description cover 4×4 block division of data representations and creation of 32 anomaly detection models or 32 LR models. In the present implementation, a user may instead focus on a specific part of the video where the machine is present. Such part or block upon user selection may be selected as a region of interest (ROI) and executed.

In an example, within the machine video (frame) as depicted in FIG. 8, 8 blocks or zones may be selected as the ROI within the image (instead of selection of 16 blocks across the entire image frame) and the anomaly detection model is executed with respect to the selected 8 boxes instead of all of 16 blocks across the image.

In other example, the 8 blocks based ROI as selected by the user may also correspond to the second area in accordance with the description of FIG. 2. Accordingly, the remaining N-8 boxes constituting the remaining image frame may be used to draw prediction for the 8 boxes and thereby restrict anomaly detection within the user selected 8 boxes.

Figure 9:
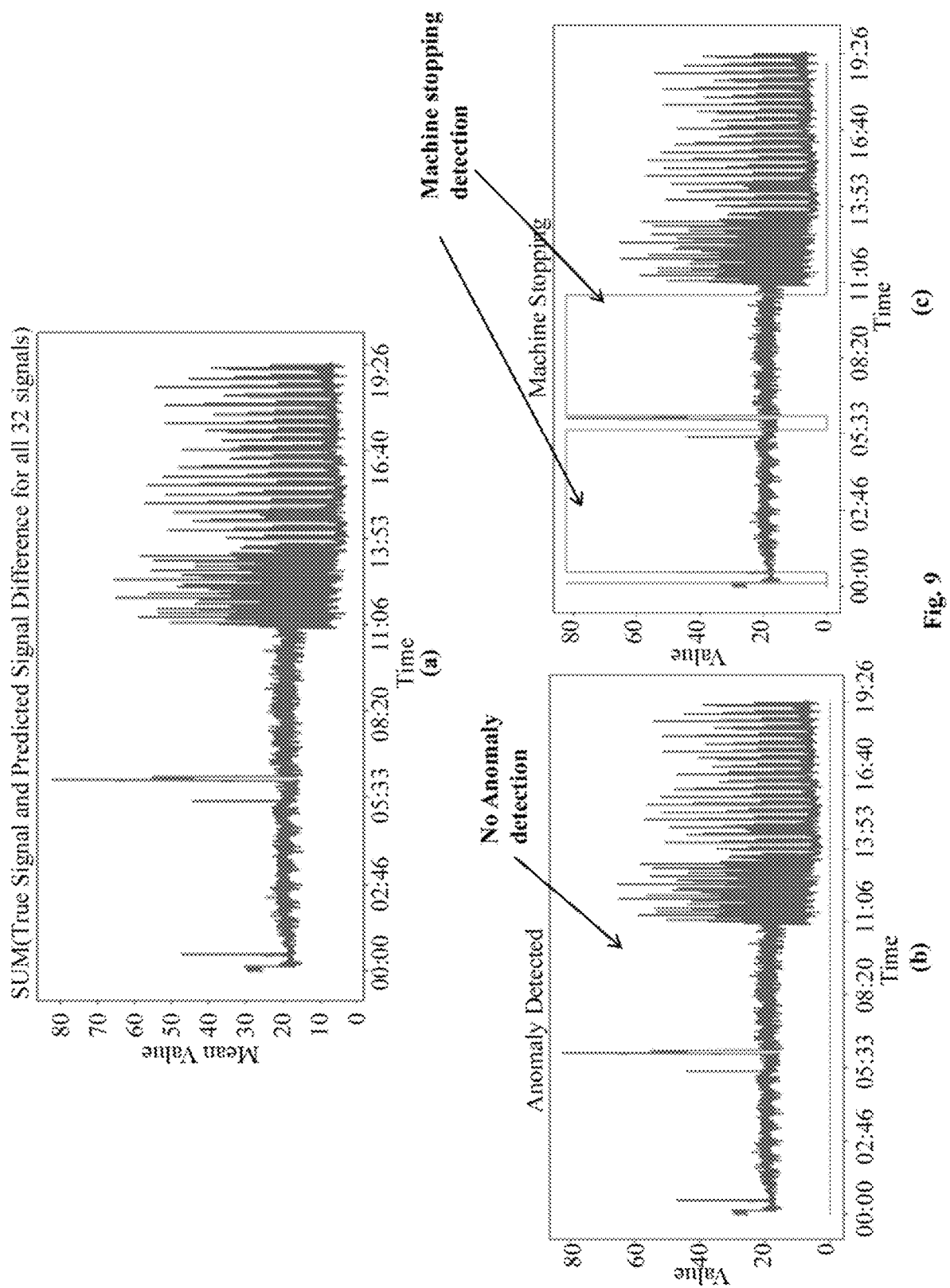
FIG. 9 illustrates another example of machine stopping and anomaly-detection in accordance with an embodiment of the present subject matter.

FIG. 9 illustrates another example of machine stopping and anomaly-detection as the output of stage 304 of FIG. 3*b* in accordance with user selected ROI in FIG. 8.

Figure 10:
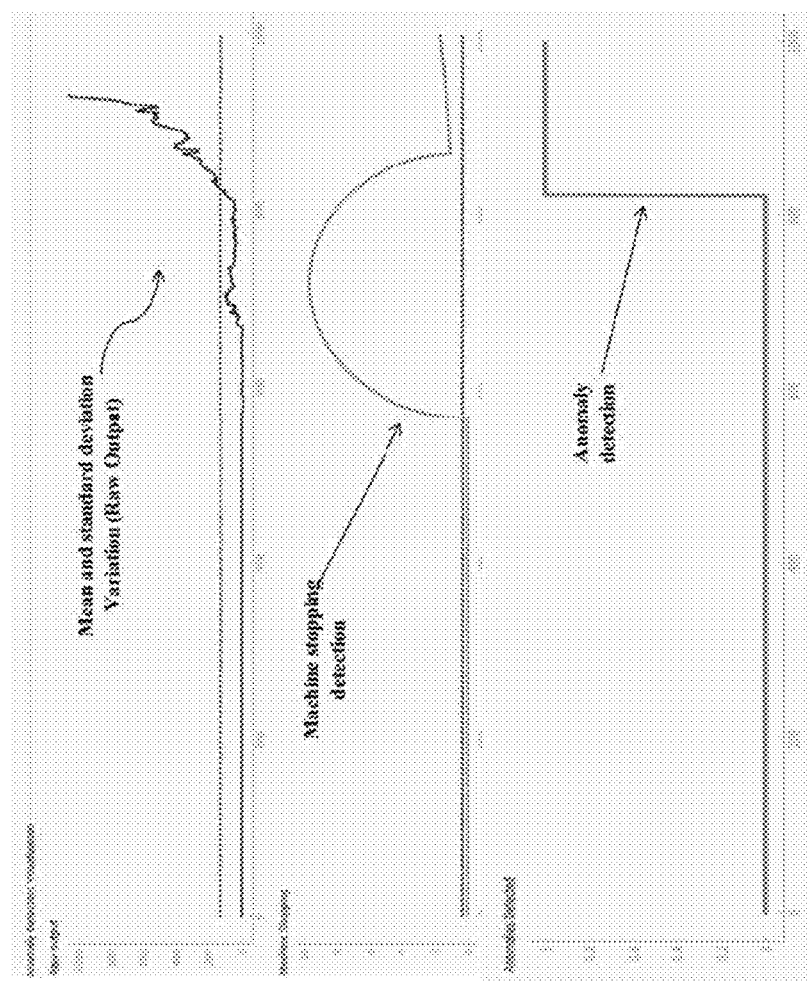
FIG. 10 illustrates a Graphical user interface (GUI) to detect anomaly in an environment based on AI techniques in accordance with an embodiment of the present subject matter.

FIG. 10 illustrates a Graphical user interface (GUI) to detect anomaly in an environment based on AI techniques.

FIG. 10*a* illustrates the first area of the display-screen of GUI configured to display one or more user-controls for receiving a user selection and thereby enable the user to select one or more data representations (e.g. image files) of one or more objects present in an environment. Based on such user selection, the GUI causes performance of steps 202 till 210 of FIG. 2

In an example, the first area comprises the user control for receiving a user selection of a data subset selected as ground truth from amongst a plurality of unlabelled data subsets during a training phase (i.e. step 102 till 110 of FIG. 1) of the plurality of AI models. The data subsets split from single mode or multimodal data pertaining to the one or more objects in the environment.

The first area further comprises the user controls for receiving a user selection of a region of interest (ROI) (as mentioned in FIG. 8) in the one or more data representations of the one or more objects in the environment for detection of abnormality with respect to the selected ROI.

The first area further comprises the user controls for receiving a selection for "controlling sensitivity" with respect to the detection of abnormality in respect of state or operation of the one or more objects in the environment for detecting the abnormality.

The first area further comprises a user control for receiving a user-selection of a "time-duration" from the GUI. Such time duration selection by the user enables detecting a halt in operation or the state of one or more objects in accordance with a threshold set by the user selection of the time duration, said detection of the halt in operation or state being performed alongside the detection of abnormality.

The first area further comprises miscellaneous user controls for receiving a user-selection of one or more features pertaining to the data representations which may be not just an image frame but may also be an audio file or a simulation representing variation of parameters. Such feature-selection may facilitate customized anomaly detection. The features may correspond to illumination, audio, resource consumption, movement, spatial orientation captured from the one or more data representations for detecting the abnormality in accordance with the features.

FIG. 10*b* illustrates a second area of display-screen configured for displaying a distribution of mean of a variable parameter pertaining to the data representations and thereby an abnormality with respect to state or operation of one or more objects within the environment. The abnormality is detected based on the generated third information and its comparison with the second information in accordance with the steps as depicted in accordance with the description of FIG. 1 and FIG. 2

As shown in FIG. 10*b*, the display of raw output corresponds to the sum (difference between the true signal and predicted signal) and thereby depicts the variation of mean and standard deviation. Based upon the extent of variation of mean and standard deviation within the raw output, a corresponding real time display of machine stopping and anomaly detection is executed. Accordingly, the time slots of variation in the raw output correspond to the time slots of detected machine stoppage and anomaly detection.

FIG. 11 illustrate an implementation of the system as illustrated in FIG. 1 till 3 in a computing environment. The present figure essentially illustrates the hardware configuration of the system. The computer system 1400 can include a set of instructions that can be executed to cause the computer system 1400 to perform any one or more of the methods disclosed. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402 (e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data The processor 1402 may implement a software program, such as code generated manually (i.e., programmed).

The computer system 1400 may include a memory 1404, such as a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may or may not further include a display unit 1410, such as a liquid crystal display (LCD), an organic light emitting diode (OLED), a flat panel display, a solid state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1416.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the computer system 1400.

The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400. The memory 1404 and the processor 1402 also may include computer-readable media as discussed above.

The present invention contemplates a computer-readable medium that includes instructions 1424 or receives and executes instructions 1424 responsive to a propagated signal so that a device connected to a network 1426 can communicate voice, video, audio, images or any other data over the network 1426. Further, the instructions 1424 may be transmitted or received over the network 1426 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1426, external media, the display 1410, or any other components in system 1400 or combinations thereof. The connection with the network 1426 may be a physical connection, such as a wired Ethernet connection or may be established wirelessly as discussed later. Likewise, the additional connections with other components of the system 1400 may be physical connections or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1400.

At least based on aforesaid, the present subject matter is able to perform anomaly detection for single or multiple machines. The proposed methods can use a single video or a combination of sensor as input and is trained on unlabelled data (unsupervised problem) and online. Moreover, anomalies of different machines can be detected separately.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A method to capture and label an undefined anomaly in an environment based on AI techniques, said method comprising:
   executing a single media or multimedia file denoting an operation or state with respect to at least one object for a predefined time period;
   capturing unlabelled data based on the execution of the file and splitting the captured unlabelled data into a plurality of sub data-sets;
   automatically labelling at least one sub-data set as a Ground Truth label and capturing one or more features from one or more sub datasets other than labelled sub dataset;
   conducting a supervised machine learning (ML) based training iteratively for each of a plurality of AI models based on:
      predicting labels of the one or more sub datasets based on the captured features; and
      comparing predicted labels of the one or more sub datasets against the labelled dataset; and
   aggregating the plurality of trained AI models to enable capturing of abnormality with respect to the operation or state of the at-least one object.

2. The method as claimed in claim 1, wherein said execution of the single media or multimedia file causes the capturing of unlabelled data as single mode or multi modal data, said multimodal input data having been captured based on one or more of:
   i) a playback of video file captured by imaging sensor for visually depicting the state or operation of the at least one device;
   ii) a playback of audio file captured by acoustic sensor for acoustically depicting the state or operation of the at least one device;
   ii) a simulation of audio-visual data captured by imaging and acoustic sensor and associated with state or operation of the at least one device;
   iii) a simulation of spatial orientation captured by an IMU sensor and associated with the state or operation of the at least one device;
   iv) a simulation of resource-consumption captured by a power-meter and associated with the state or operation of the at least one device; and
   wherein said single mode or multimodal data is associated with a cyclic pattern associated with the state or operation of the at least one object.

3. The method as claimed in claim 2, wherein the capturing of the features from the one or more sub data set other than the labelled sub dataset comprises:
   capturing variation of at-least one parameter related to the operation or state of the at least one object for the predefined time period based on the execution of the file;
   capturing the cyclic pattern related to the operation or state of the at least one object for the predefined time period based on the execution of the file; and
   determining at-least one type of statistical-feature from said variation of at-least one parameter and/or the cyclic pattern;
   wherein the at least one varying parameter and the cyclic pattern is obtained as an aggregated value across a plurality of values obtained from single mode or multimodal data, and wherein the at least one determined statistical parameter relates to a standard deviation or mean associated with respect to the varying parameter.

4. The method as claimed in claim 1, further comprising:
   testing the aggregated AI model based on the plurality of trained AI modules to detect abnormality in the state or operation of the at least one object based on a current determined statistical parameter exceeding the statistical parameter determined during the training, said abnormality corresponding to:
   a) either halt in operation or state of the at least one object; and
   b) an irregularity in the operation or state of the at least one object.

5. A method to detect anomaly in an environment based on AI techniques, said method comprising:
   a) receiving one or more data representations of one or more objects present in an environment;
   b) capturing a first-type of information from a first-area within the one or more data representations;
   c) capturing a second-type of information from a second-area different than the first area in the data representations;
   d) generating a third information from the first information, said third information corresponding to predicted information for the second area using one or more artificial-intelligence models for evaluating the second information; and
   e) comparing the third information with the second information to determine abnormality with respect to state or operation of one or more objects within the environment.

6. The method as claimed in claim 5, wherein generating the third information comprises predicting a signal-value for the second area based on the first type of information of the first area using the plurality of AI models denoted by one or more of: linear regression model, a Multi-layer perceptron (MLP) model, a deep learning model.

7. The method as claimed in claim 5, wherein the one or more objects undergo a cyclic operation within the environment, said cyclic operation being detectable from the data representations, said data representations corresponding to single mode or multimodal data comprising images, audio, audio-visual data, resource consumption, and spatial orientation pertaining to the at least one object within the environment.

8. The method as claimed in claim 5, wherein the capturing of the first information and the second information comprises capturing the first information and the second information from the one or more data representations pertaining to a same time slot.

9. The method as claimed in claim 6, wherein generating the third information comprises predicting the signal value for the second area through the AI model configured for estimating a signal (N) in respect of the second area from a plurality of the signals (N-1) associated with the first area.

10. The method as claimed in claim 9, further comprising iteratively executing the steps a) to e) to estimate N number of the signals for the second area an inference stage, wherein the AI model corresponds to an aggregation of one or more AI model trained during a training phase in accordance with the steps as claimed in claim 1.

11. The method as claimed in claim 9, further comprising:
   receiving a user selection of an region of interest (ROI) in the one or more data representations of the one or more objects in the environment through a GUI for facilitating the detection of the abnormality, said abnormality corresponding to an undefined anomaly.

12. The method as claimed in claim 11, wherein the ROI corresponds to the second-area within the one or more data representations for enabling the capturing of the second type of the information.

13. The method as claimed in claim 11, further comprising:
receiving a user-selection through a control at the GUI for varying sensitivity with respect to the detection of abnormality in respect of state or operation of the one or more objects in the environment; and
detecting the abnormality in accordance with a threshold set by the user selection of the sensitivity.

14. The method according to claim 11, further comprising:
receiving a user-selection of a time-duration from the GUI; and
detecting a halt in operation or the state of one or more objects in accordance with a threshold set by the user selection of the time duration, said detection of the halt in operation or state being performed alongside the detection of abnormality.

15. The method according to claim 11, further comprising:
receiving a user-selection of one or more features pertaining to data representations from the GUI, said features optionally defining one or more of illumination, audio, resource consumption, movement, spatial-orientation captured within the one or more data representations with respect to the one or more objects; and
detecting the abnormality in accordance with the features selected through the user-selection.

16. The method according to claim 11, further comprising displaying through the GUI one or more of:
a detected abnormality with respect to state and operation of the one or more objects; and
a detected halt in operation or state of the one or more objects.

17. The method according to claim 16, wherein the displaying of abnormality and/or halt in operation or state comprises:
displaying a graphical distribution of one or more of mean or standard deviation pertaining to the one or more captured data representations against the time slots pertaining to capturing of the data representations; and
identifying at least a portion of said graphical distribution as corresponding to the abnormality or the halt in operation or state.

18. A Graphical user interface (GUI) to detect anomaly in an environment based on AI techniques, said GUI comprising:
a first area of display-screen configured to display one or more user-controls for receiving a user selection and thereby enable performance of the steps of:
a) receiving one or more data representations of one or more objects present in an environment;
b) capturing a first-type of information from a first-area within the one or more data representations; and
c) capturing a second-type of information from a second-area different than the first area in the data representations;
a second area of display-screen configured for displaying a distribution of mean of a variable parameter pertaining to the data representations and thereby an abnormality with respect to state or operation of one or more objects within the environment, said abnormality having been detected based on the steps of:
d) generating a third information from the first information, said third information corresponding to predicted information for the second area using one or more artificial-intelligence models for evaluating the second information; and
e) comparing the third information with the second information to determine abnormality with respect to state or operation of one or more objects within the environment.

19. The GUI as claimed in claim 18, wherein the first area comprises the user control for one or more of:
receiving a user selection of a data subset selected as ground truth from amongst a plurality of unlabelled data subsets during a training phase of the plurality of AI models, said data subsets split from single mode or multimodal data pertaining to the one or more objects in the environment;
receiving a user selection of a region of interest (ROI) in the one or more data representations of the one or more objects in the environment for detection of abnormality with respect to the selected ROI;
receiving a user-selection for controlling sensitivity with respect to the detection of abnormality in respect of state or operation of the one or more objects in the environment for detecting the abnormality; and
receiving a user-selection of one or more features pertaining to the data representations, said features defining one or more of illumination, audio, resource consumption, movement, spatial orientation captured from the one or more data representations for detecting the abnormality in accordance with the features.

20. The GUI as claimed in claim 18, wherein the first area comprises a user control for:
receiving a user-selection of a time-duration from the GUI; and
detecting a halt in operation or the state of one or more objects in accordance with a threshold set by the user selection of the time duration, said detection of the halt in operation or state being performed alongside the detection of abnormality.

* * * * *